United States Patent [19]

Alexander

[11] Patent Number: 4,597,039
[45] Date of Patent: Jun. 24, 1986

[54] SWITCHED CAPACITOR INDUCTION MOTOR DRIVE

[75] Inventor: William C. Alexander, Austin, Tex.

[73] Assignee: Solar Refining, Inc., Austin, Tex.

[21] Appl. No.: 616,832

[22] Filed: Jun. 4, 1984

Related U.S. Application Data

[63] Continuation-in-part of Ser. No. 534,567, Sep. 22, 1983, abandoned.

[51] Int. Cl.⁴ ............................................. H02M 7/515
[52] U.S. Cl. ....................................... 363/138; 363/37; 363/96
[58] Field of Search ................. 363/95, 96, 135, 136, 363/137, 138, 35, 37, 51, 58; 318/798, 800–802, 806

[56] References Cited

U.S. PATENT DOCUMENTS 4,224,661 9/1980 Chuguev et al. ............... 363/138 X
4,244,017 1/1981 Steigerwald ....................... 363/138

FOREIGN PATENT DOCUMENTS 2926470 1/1981 Fed. Rep. of Germany ...... 363/138
47-21856 6/1972 Japan ................................. 363/138

Primary Examiner—Peter S. Wong
Attorney, Agent, or Firm—Pravel, Gambrell, Hewitt & Kimball

[57] ABSTRACT

A switched capacitor, induction motor drive circuit is provided wherein a switched capacitor in parallel with the inductive motor load at each output terminal is provided for commutation or switching of the main output inverter elements thereby protecting the switching elements from excessive voltage during switching or commutation operation in combination with a unique switching control circuit which enables minimal voltage switching elements to be used and which eliminates the need for anti-parallel rectifiers in the inverter output stage.

4 Claims, 4 Drawing Figures

SWITCHED CAPACITOR INDUCTION MOTOR DRIVE

This is a continuation-in-part of applicant's copending U.S. patent application Ser. No. 534,567 filed Sept. 22, 1983, now abandoned.

BACKGROUND OF THE INVENTION

1. Field of the Invention

The present invention relates to direct current linked, alternating current inverter drives for induction motors and machines having similar load characteristics.

2. Description of the Prior Art

In the past, alternating current induction motor drive circuits were generally either constant current drives, wherein the inverter output section was provided with a relatively constant direct current, or constant voltage drives wherein the inverter output section was provided with a relatively constant direct current voltage. Adjustable speed voltage-fed drives typically were either variable voltage, variable frequency square wave inverter drives or more recently pulsed width modulation inverter drives.

Pulsed width modulation drives included a constant link voltage input to a pulse modulation circuit which synthesized a variable voltage, variable frequency motor drive output.

A typical, square wave, variable voltage, variable frequency inverter drive is illustrated in FIG. 1. The inverter drive illustrated in FIG. 1 does not include the commutation circuitry required to force commutate the output silicon controlled rectifiers or thyristors. In these type of six-step inverter drives, each of the inverter legs was enabled for 180° to provide an output line-to-line voltage generally similar to the six-step wave form illustrated schematically in FIG. 1.

In these square wave inverter type motor drives, the speed of the motor was controlled by varying the inverter commutation frequency. In order to maintain adequate torque capability it was necessary to also vary the DC link voltage to maintain a constant ratio of voltage to frequency. Hence, these types of drives were referred to as variable voltage, variable frequency, inverter drives.

Inverter drives typically used gate controlled, switched circuit elements such as thyristors or silicon controlled rectifiers, which were enabled by providing a gate bias voltage but which also required external forced commutation circuitry to provide reverse bias voltage to disable the switch. Alternatively, some inverter drives used gate controlled switching elements such as transistors, gate turn-off thyristors or insulated gate transistors. In circuits with these type of switching elements, current flow through the switch was interrupted by applying, or removing, base-to-emitter bias voltage. In either case, the switching element was used to interrupt current flow into the induction motor which inherently produced rapid voltage changes across the switching element, i.e., a high dV/dT.

Since most economically available switching elements could not tolerate these rapid voltage changes, typical inverter drives also included some capacitive buffering or snubbering to protect the switching element. Snubbering circuits, however, produced losses proportional to the amount of protection afforded. In the conventional snubbering circuit illustrated in FIG. 2, when the switch was opened, the voltage was controlled as current flowed readily through the diode into the capacitor. When the switch was closed, the capacitor discharged slowly through the resistor. Accordingly, each switching cycle produced losses on the order of one-half $CV^2$. To reduce losses, it was thus necessary to keep the snubbering capacitance as small as possible, and prior efforts at improving switching efficiency were directed to reducing switching times and improving the voltage tolerance of switching elements to minimize snubbering losses. Additionally, conventional inverter drives required free-wheeling, rectifiers or diodes in anti-parallel with the inverter switching elements to recirculate the inductive current from the motor after switching. These free-wheeling diodes prevented reverse voltage on the output, thereby requiring reverse current flow for negative power, i.e., generating, which in turn required reverse thyristors in the drive input section to reverse power flow into the A.C. supply line. High voltage rate or high dV/dT switching was thus inherently complex and expensive.

SUMMARY OF THE INVENTION

In contrast to the prior art, the drive of the present invention includes a six-step voltage source inverter with capacitive loading on the output wherein the capacitive energy storage capacity is only slightly less than the inductive energy storage capacity of the motor. In prior art inverter drives, such large capacitances would have produced intolerable snubbering losses, but due to the unique features of the drive of the present invention, such losses are avoided.

There are several direct benefits of employing such capacitive loading in the output stage in the drive of the present invention. The rate of change of voltage across the inverter switching elements is decreased significantly, by as much as 100 to 1000 times, and is typically about 0.5 volts per microsecond for 230 volt A.C. drive. This reduction in the rate of voltage change at the switching element permits the use of less expensive switching devices and simpler switching techniques. Furthermore, the drive of the present invention does not require free-wheeling, anti-parallel diodes at the output stage, since large induction currents are absorbed in the capacitive buffering rather than being recirculated around the output switching elements. This simplifies the output section of the inverter drive and allows negative voltage operation of the output to produce negative torque. In the drive of the present invention, full four-quadrant operation is possible with only six switching elements or thyristors in each input and output section.

In the drive of the present invention, it is not only necessary that the switching frequency of each switching element in the output stage be controlled to effect motor speed but also that the switching elements be enabled only when the voltage across the switching device is less than a prescribed amount, typically five volts. By thus controlling the output switching elements, the drive of the present invention prevents destructive current flow into the buffering capacitors and greatly reduces the chances of a short circuit in the output bridge which might occur if opposite polarity elements in the output bridge were enabled simultaneously.

In the drive according to the present invention, simple switching elements capable of reverse voltage blocking such as the transistor commutated thyristors switching element, disclosed in my copending U.S.

patent application Ser. No. 534,567, filed Sept. 22, 1983, the contents of which are incorporated by reference herein, may be used as the inverter switching elements in the drive of the present invention.

The benefits provided by the motor drive of the present invention include more efficient inversion, reduction of switching losses, and elimination of snubber and forced commutation losses. Furthermore, lower voltage tolerant switching elements may be used in the output stage since there are no transient over voltages caused by high speed switching. The drive of the present invention also provides quieter inverter and motor operation by eliminating current surges and more efficient, cooler motor operation by minimizing the harmonic currents which in conventional drives are absorbed in the motor as a result of voltage switching.

By eliminating the need for anti-parallel, free-wheeling diodes, the drive of the present invention permits the output switching elements, such as silicon controlled rectifiers, to be reverse biased during commutation. Furthermore, the elimination of these free-wheeling diodes also reduces the likelihood of line-to-ground short circuits, and provides a drive which produces almost constant current flow into the output during all phases of operation, full speed as well as low speed. When combined with the characteristic constant voltage, this provides near constant power and therefore very low torque pulsation in the motor even at low frequencies. Since almost a constant current flow exists in the drive, relatively small filter capacitors may be used thereby reducing the cost of the overall drive.

DESCRIPTION OF THE PREFERRED EMBODIMENT

Figure 3:
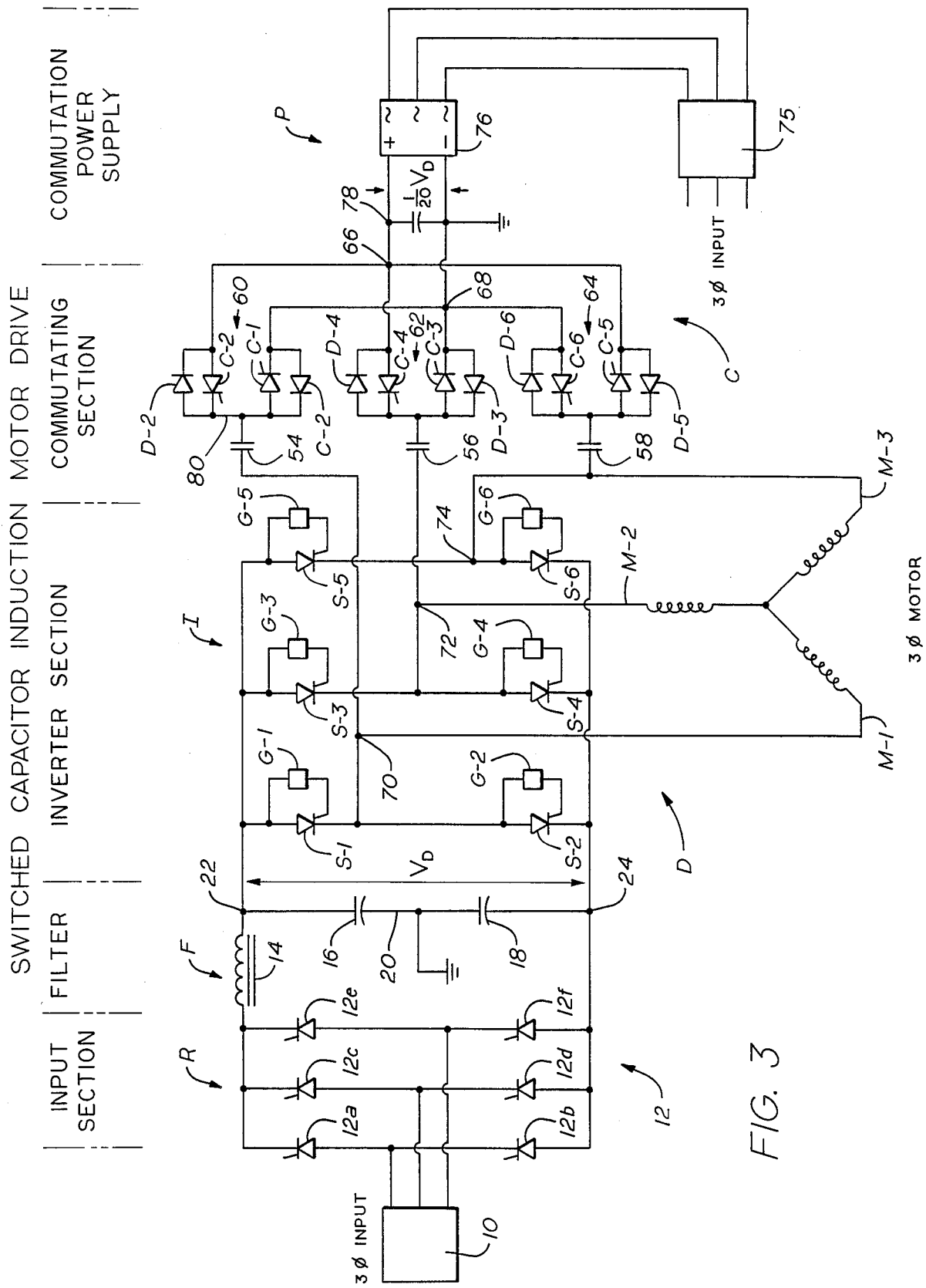
FIG. 3 is a schematic electric circuit diagram of a inverter motor drive in accordance with the present invention.

In the drawings, the letter D designates generally a switched capacitor induction motor drive according to the present invention. Referring now to FIG. 3, drive D includes an input circuit R, a filter circuit F, an inverter circuit I, a commutating circuit C, and a commutation power supply P.

Input circuit R includes a three-phase alternating current line input 10 and a conventional six element, three-phase bridge rectifier 12. Rectifier 12 converts line alternating current voltage to direct current voltage which is impressed on filter F. Motor voltage control is achieved in conventional manner by controlling the phase timing of silicon controlled thyristors 12a, 12b, 12c, 12d, 12e, and 12f which form rectifier bridge 12. The details of the conventional motor voltage control do not form a part of the present invention and thus are not illustrated in FIG. 3.

Filter F includes inductor 14 and non-polarized capacitors 16, 18. Capacitors 16, 18 form a series circuit path at the output of the filter F and are each connected to a common neutral terminal 20. Input circuit R and filter F thus provide a D.C. link voltage $V_D$ at terminals 22, 24 which is impressed upon inverter circuit I.

Inverter circuit I includes six switching elements S1-S6 which form a force commutated inverter bridge to provide an output drive voltage to three-phase motor M. Switches S1-S6 may be any suitable switching element capable of reverse voltage blocking, such as insulated gate transistors, a transistor controlled thyristor combination as disclosed in my copending U.S. patent application Ser. No. 534,567 or conventional thyristors, for example. In the preferred embodiment, switches S1-S6 are silicon controlled rectifiers or thyristors. The unique commutation and switching control circuitry of the present invention permits the use of relatively inexpensive, readily available thyristors for switches S1-S6 which are only exposed to relatively low rates of voltage change during switching. For example, switches S1-S6 experience about one-half volt per microsecond during switching for a two-hundred-thirty volt alternating current motor drive.

Inverter I also includes thyristor switching control circuits G-1 through G-6 associated with thyristors S-1 through S-6, respectively. The details of circuits G-1, G-6 are illustrated in FIG. 4.

The switching of each thyristor S is dually controlled by commutation circuit C and by control circuit G. Control circuit G ensures that thyristors S are not enabled unless the voltage difference from anode to cathode on the respective thyristor S is within prescribed low limits. In this manner, inexpensive, readily available thyristors can be used for switching, and the need for free-wheeling anti-parallel diodes around switches S1-S6 is eliminated. One advantage obtained by eliminating these diodes, is that switches S1-S6 may be reverse biased during commutation. Another advantage is that in the drive of the present invention the need for snubbering is eliminated and the losses and adverse operating effects caused by harmonics introduced in conventional high voltage switching drives are greatly reduced.

Figure 1:
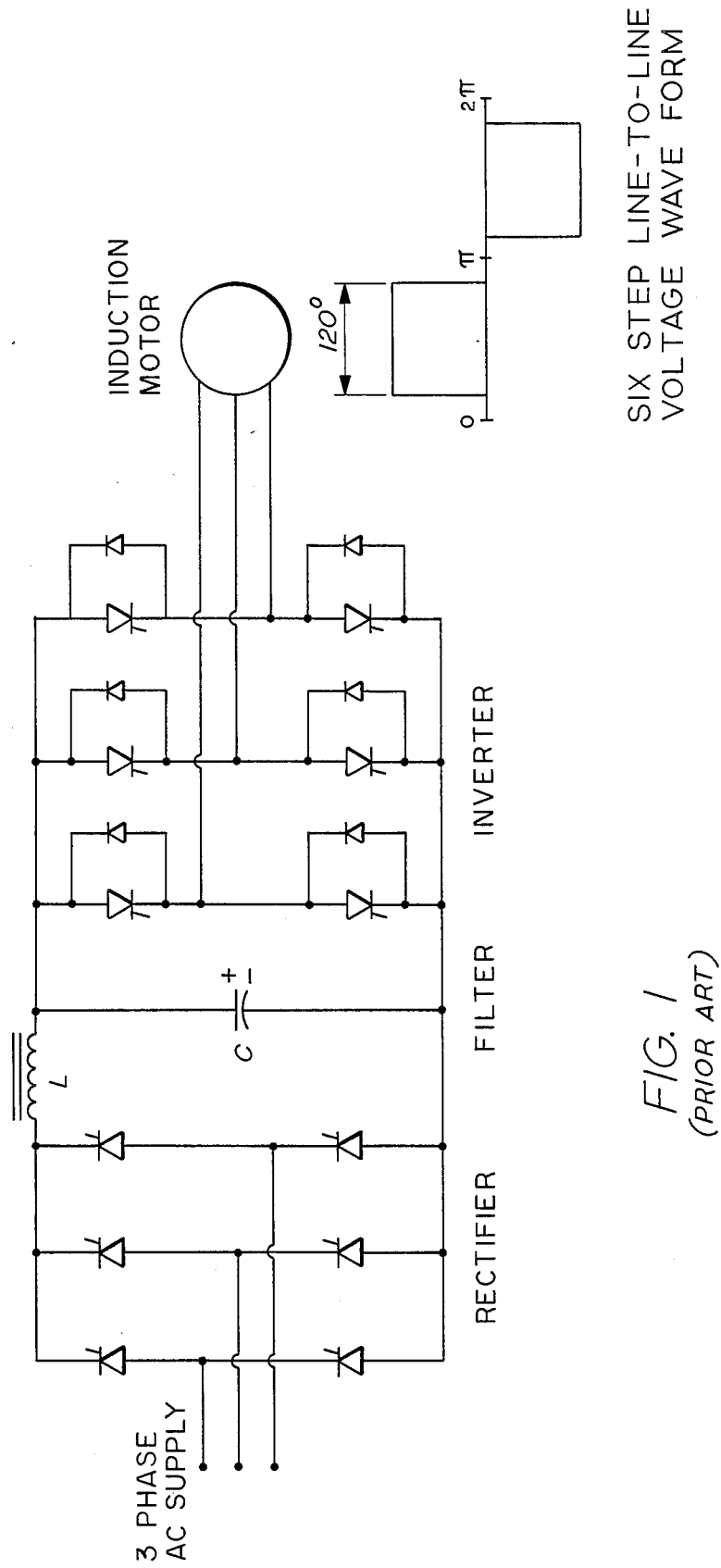
FIG. 1 is a schematic electric circuit diagram of a conventional variable-voltage, variable-frequency square wave induction motor drive.
Figure 4:
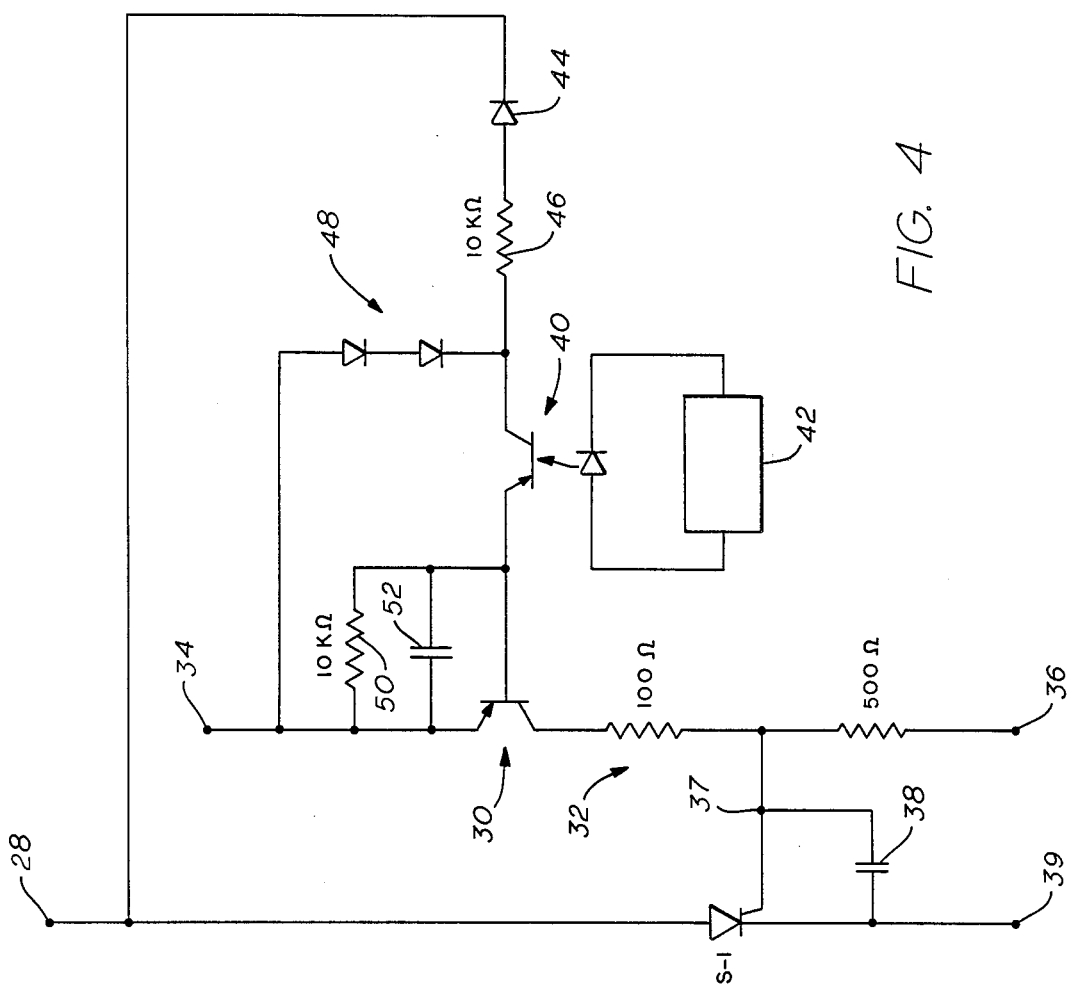
FIG. 4 is a schematic electric circuit diagram of a portion of a motor drive according to the present invention.
Figure 2:
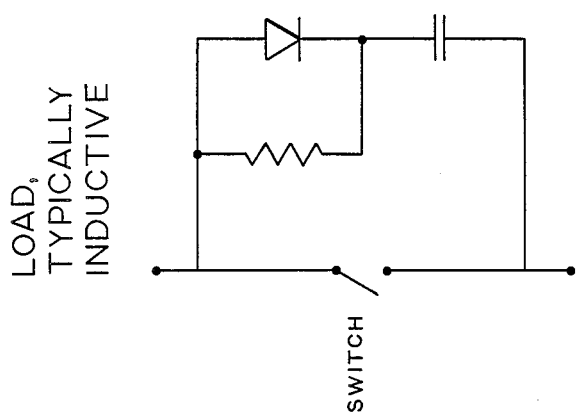
FIG. 2 is a schematic electrical circuit diagram of a conventional capacitive buffering or snubbering.

Referring now to FIG. 4, control circuit G-1, which is identical in all respects to circuits G-2, G-6, is connected to the gate 37 and anode 28 of thyristor S-1 in the manner illustrated. Control circuit G-1 includes PNP gate drive transistor 30 and a series resistor voltage divider network 32 connected to the collector of transistor 30 to provide enabling gate current to SCR S-1 when appropriate. The emitter of transistor 30 is connected to a low level positive direct current voltage supply 34, which may be fixed, for example, at positive six volts D.C. The collector of transistor 30 is connected through divider circuit 32 to a low level negative direct current supply 36 which may be fixed, for example, at negative five volts. A capacitor 38 is provided between the gate 37 and cathode 39 of SCR S-1 to delay briefly the enabling of SCR S-1 after a positive, enabling voltage is applied to gate 37 and to assist disabling SCR S-1 when the voltage applied to cathode 39 is reversed in the manner described hereafter.

The primary purpose of circuit G-1 is to enable SCR S-1 for motor control, and to do so only when the voltage across rectifier S-1 is within prescribed low limits. Rectifier S-1 is enabled/disabled by providing/removing gate drive via transistor 30. Transistor 30 is enabled, and the voltage to gate 37 is made positive with respect to cathode 39 only when two conditions are satisfied: (a) the voltage across rectifier S-1 is within prescribed limits; (b) opto-isolator 40 is enabled in response to a frequency dependent enabling signal generated by conventional motor frequency control circuit 42 which is illustrated schematically in FIG. 4. Circuit 42 provides a frequency dependent enabling signal to opto-isolator 40 to control the frequency of switching to to affect motor control in the conventional manner.

Control circuit G-1 also includes rectifier 44 and resistor 46 in the collector circuit of opto-isolator 40. As can be seen by referring to FIG. 4, transistor 30 is only enabled when opto-isolator 40 is enabled in response to a control signal from motor frequency control circuit 42 and when the voltage applied to diode 44 is sufficient to forward bias diode 44 and allow base current to be provided to transistor 30. Thus transistor 30 is enabled only when the voltage at terminal 28, i.e., the voltage applied to SCR S-1, is sufficiently low so that diode 44 is forward biased by the voltage provided via low voltage DC supply 34 across diodes 48 and resistor 46. In this manner, rectifier S-1 is enabled only when the voltage across rectifier S-1, i.e., from terminal 28 to terminal 39 is less than a prescribed minimum so as to achieve low dV-dT switching of control rectifiers S-1 through S-6. Diodes 48 (FIG. 4) are provided to protect opto-isolator 40 from excessive voltages when rectifier S-1 is reversed biased. The value of resistor 46 is selected so as to prescribe the maximum switching voltage which will be permitted, which in the preferred embodiment is approximately five volts. Resistor 50 and capacitor 52 are provided in the emitter to base circuit of transistor 30 to delay turn-on of transistor 30 after both opto-isolator 40 and diode 44 are enabled.

Commutation circuit C includes motor-run capacitors 54, 56 and 58 connected at one end to motor winding circuits M-1 M-2, and M-3, respectively (FIG. 3) and on the other end of commutation thyristor and diode networks 60, 62 and 64, respectively. Thyristor/diode networks 60, 62 and 64 provide a circuit path from windings M-1, M-2 and M-3 through capacitors 54, 56, and 58, respecively to power supply P to permit capacitors 54, 56 and 58 to absorb recirculation current from motor terminals M-1, M-2 and M-3 during switching. Capacitors 54, 56 and 58 additionally provide reverse bias voltage for commutation of thyristors S-1 through S-6 in the manner described in detail below. Thyristor/diode networks 60, 62 and 64 are connected in anti-parallel pairs with polarities aligned in the manner illustrated in FIG. 3. Networks 60, 62 and 64 transmit voltage changes from terminals 66 and 68 to terminals 70, 72 and 74 via capacitors 54, 56 and 58, respectively to provide reverse bias voltage to force commutate main thyristors S-1 through S-6.

Commutation power supply P is fixed relative to the neutral terminal 20 and provides low level, direct current commutation voltage to commutation circuit C. Power supply P includes conventional three phase input transformer 75 which steps the voltage down from input line power 10 to provide approximately one percent of drive input power to a conventional three phase full wave rectifier 76. Rectifier 76 provides a direct current voltage output at capacitor 78 to drive the commutation circuit C in the manner described hereinafter. The value of capacitor 78 and the other components of circuit P are selected to provide an output voltage on capacitor 78 which is typically five to ten percent of the drive voltage Vd. Self-commutating switching elements such as insulated gate transistors or transistor controlled thyristors do not require this external commutation circuitry. However, they do require the motor-run capacitors.

This drive supplies three-phase adjustable frequency and voltage drive to a three-phase induction motor. Voltage is supplied to the output section by the previously described input and filter sections. Alternating current is supplied to the motor by alternate conduction of each thyristor in a bridge. Balanced three-phase output is achieved in the conventional manner by consecutively switching the polarity of the bridges.

Since silicon controlled rectifiers, or SCR's must be externally commutated, the commutation section C and commutation power supply P are provided to allow for external forced commutation of the main SCR's.

Start up of the drive is accomplished by applying a low voltage to the inverter section I with one SCR on each of the three output bridges enabled. One bridge has a polarity opposite of the other two. Current begins to flow through the motor windings from the applied voltage. Additionally, commutating SCR's C-1 through C-6 are enabled when corresponding main SCR's S-1 through S-6 are on and are disabled when their corresponding SCR's S-1 through S-6 are off, the correspondence being shown in FIG. 3. This correspondence is established by opposite polarity. For example, commutation SCR C-1 on the low voltage side of the commutation power supply P corresponds to, and is enabled simultaneously with, main SCR S-1 on the high voltage side of the inverter section.

Clocking of the inverter I begins when a main SCR S is commutated. The commutation process will be illustrated by example. A commutation is initiated by first removing gate drive from a main SCR such as S-1, for example, which is to be commutated and its corresponding commutation SCR, C-1. After a short time, typically 100 microseconds, the gate circuits of the main SCR in the opposite position of the output bridge, i.e., S-2, and its corresponding commutation SCR C-2, are enabled. SCR S-2 will not receive gate current because Diode 44 in FIG. 4 is reversed biased as long as S-2 blocks more than typically 5 volts in the forward direction. Prior to the commutation of SCR S-1, terminal 80 on motor run capacitor 54 is at the lower potential of commutation Power Supply P. When SCR C-2 is enabled, it turns on, thereby quickly raising terminal 80 to the higher potential of P. This causes the voltage at terminal 70 connected to capacitor 54 to apply a reverse bias voltage to S-1. Current through SCR S-1 is stopped and quickly diverted into capacitor 54, C-2, and P.

SCR S-1 is reverse biased by typically 30 volts for a 230 volt drive. Its gate also receives a negative bias to speed turn-off. Current flow through SCR C-2, capacitor 54 and motor winding M-1 causes a voltage rate of change of typically 0.5 volts per microsecond across capacitor 54. Therefore SCR S-1 will be reversed biased for typically 60 microseconds. During this time, SCR S-1 changes from the conducting to the non-conducting state. When SCR S-1 again sees forward bias voltage, the rate-of-voltage-change is still typically 0.5 volts per microsecond for a 230 volt drive. This low dV/dT reduces the required reverse bias voltage by reducing the effective turn-off time.

A significant amount of time, typically 600 microseconds, is required for the voltage across SCR S-2 to become low enough for gate drive to be applied to it. During this time, neither SCR S-1 nor SCR S-2 are conducting. The motor leakage inductance exchanging energy with motor run capacitor 54 is responsible for this low dV/dT and relatively long quiescent time. Typically this leakage inductance is sufficient to cause the voltage across SCR S-2 to become negative, as capacitor 54 continues to absorb the motor recirculation current. At some point, current flow through winding M-1, capacitor 54, and SCR C-2 stops and reverses since winding M-1 now has a negative, with respect to motor neutral, voltage on it. Until SCR S-2 is forward biased again, current flows through capacitor 54 and anti-parallel diode D-2. When SCR S-2 becomes forward biased, current is transferred from capacitor 44 and diode D-2 into SCR S-2 and flows into terminal 24. Current flow through SCR C-2 has ceased and is therefore "off".

Current flow through SCR S-2 continues until its half-cycle is complete, and SCR C-1 is enabled to begin the commutation of SCR S-2. The commutation process on the other two output bridges is identical.

Drive control consists of driving the inverter section I, via motor control circuit 42, at the frequency selected by manual or automatic external control. The output voltage is determined by the frequency and the load on the motor. Generally, higher frequency calls for a higher voltage and more load calls for a higher voltage and vice-versa. Voltage must be controlled accurately with load, because there are no recirculation diodes in the inverter section to accommodate low power factor. Therefore, the voltage control used in association with the drive of the present invention should raise or lower the voltage as required by the load and frequency control to maintain the optimum power factor on the output. Power factor sensing can be done by any of several well known techniques.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. An alternating current, induction motor drive, for providing alternating drive current from a direct current voltage source, comprising:
   a plurality of gate controlled motor drive switching elements forming a three-phase motor drive inverter circuit, said inverter circuit being connected between the voltage source and the motor;
   switch control means for controlling said motor drive switching elements in timed relation so as to provided the three-phase drive current to the motor, said switch control means including voltage sensing means for preventing said switching elements from being actuated unless the voltage across said switching elements is less than a prescribed minimum value, said switch control means comprising:
     means for force-commutating said switching elements; and
     gate control means for selectively enabling said gate controlled switching elements in a timed relation so as to provide three-phase drive current to the motor; and
   a plurality of capacitive buffering means having a first terminal and a second terminal, said first terminal being connected between said switching elements in each phase of said inverter circuit and said second terminal being connected to said force-commutation means, said capacitive buffering means being selected to have an energy storage capacity slightly less than the energy storage capacity of the motor.

2. The drive of claim 1, wherein said force-commutation means comprises:
   means for selectively applying reverse bias voltage to said gate controlled switching elements to force-commutate said switching elements in timed relation so as to provide three-phase drive current to the motor.

3. The drive of claim 2, wherein said reverse bias means comprises:
   a direct current commutation voltage source having a first terminal and a second terminal, said commutation voltage source being adapted to provide an output voltage differential between said first and said second terminals;
   a first plurality of commutation circuits connected between the second terminal of each capacitive buffering means and said first terminal of said commutation voltage source;
   a second plurality of commutation circuits connected in parallel with said first commutation circuits between the second terminal of each capacitive buffering means and said second terminal of said commutation voltage source; wherein:
     each of said first commutation circuits comprises:
       a first gate controlled commutation switching element connected so as to be enabled when the voltage at said first terminal of said commutation voltage source is positive with respect to the voltage at said second terminal of said capacitive buffering means; and
       a first rectifier connected in anti-parallel to said first gate controlled commutation switching element so as to be enabled when the voltage at said first terminal of said commutation voltage source is negative with respect to the voltage at said second terminal of said capacitive buffering means;
     each of said second commutation circuits comprises:
       a second gate controlled commutation switching element connected so as to be enabled when the voltage at said second terminal of said capacitive buffering means is positive with respect to said second terminal of said commutation voltage source; and,
       a second rectifier connected in anti-parallel to said second gate controlled commutation switching element so as to be enabled when the voltage at said second terminal of said capacitive buffering means is negative with respect to said second terminal of said commutation voltage source; and, further comprising
   commutation switching control means for selectively enabling said gate controlled commutation switching elements in timed relations so as to provide three-phase drive current to the motor.

4. The drive of claim 1, wherein said gate control means comprises a circuit having a first gate control terminal, a second gate control terminal, and a third gate control terminal, said first gate control terminal being connected to a low level direct current voltage source, said second gate control terminal being connected to the gate circuit of said controlled motor drive switching elements, and said third gate control terminal being connected to the anode of said gate control motor drive switching elements; and wherein said circuit further comprises:
- a first gate control switching element connected between said first gate control circuit terminal and said second gate control circuit terminal;
- a second gate control switching element connected between the enabling terminal of said first gate control switching element and said third gate control circuit terminal;
- a rectifier connected in series between the output terminal of said second switching element and said third gate control circuit terminal so as to be enabled when the voltage at said third gate control circuit terminal is negative with respect to the voltage at said second gate control switching element;
- current blocking means connected between said first gate control circuit terminal and the junction between said second switching element and said rectifier, so as to clamp the voltage at said junction for preventing destructive voltage drops across said second switching element; and,
- enabling means for enabling said first and said second gate control switching elements in timed relation to provide an output gate current to said second gate control terminal thereby enabling said gate control motor drive switching elements to provide three-phase direct current drive to the motor.

* * * * *